United States Patent [19]

McInerney

[11] 3,878,266

[45] Apr. 15, 1975

[54] POLYOLEFIN COMPOSITION RESISTANT TO HOT ALKALINE SOLUTIONS

[75] Inventor: Edward J. McInerney, Louisville, Ky.

[73] Assignee: General Electric Company, New York, N.Y.

[22] Filed: Nov. 12, 1973

[21] Appl. No.: 414,915

[52] U.S. Cl.................. 260/897 A; 260/45.75 T; 260/45.85 B
[51] Int. Cl. ............................................ C08f 45/62
[58] Field of Search ... 260/45.75 K, 45.85 B, 897 A

[56] References Cited
UNITED STATES PATENTS

| | | | |
|---|---|---|---|
| 3,047,608 | 7/1962 | Friedman et al. | 260/45.7 |
| 3,149,093 | 9/1964 | Hecker et al. | 260/45.75 |
| 3,285,855 | 11/1966 | Dexter | 260/45.85 |
| 3,310,509 | 3/1967 | Fukumoto et al. | 260/45.75 |
| 3,409,587 | 11/1968 | Mills | 260/45.85 |
| 3,531,483 | 9/1970 | Gilles | 260/45.8 |

Primary Examiner—V. P. Hoke

[57] ABSTRACT

A composition characterized by resistance to hot alkaline solutions comprising a polymer formed from monomers including propylene, a stabilizer system including tetrakis [methylene 3-(3',5'-di-t-butyl-4'-hydroxyphenyl) propionate] methane and a tin maleate.

9 Claims, No Drawings

POLYOLEFIN COMPOSITION RESISTANT TO HOT ALKALINE SOLUTIONS

BACKGROUND OF THE INVENTION

The present invention relates to a propylene-polymer composition which is particularly characterized by resistance to discoloration or deterioration in a hot alkaline aqueous environment such as that existing in an automatic dishwasher.

The design environment for a dishwasher tub is direct exposure to 180°F, pH12 dishwasher detergent solution with spot temperatures exceeding 180°F during the drying cycle. Because of these conditions, the usual tub materials have been porcelain enamel on steel, vinyl plastisol on steel, and stainless steel. Polypropylene compounds have been used in overseas dishwashers. However, the usual polypropylene compounds, including those containing various stabilizer combinations or systems used or proposed for imparting heat, light or strength stability to polypropylene resins, do not meet the high United States reliability requirements for dishwasher tubs. In fact, as disclosed for example in U.S. pat. No. 3,409,587—Mills, the industry has experienced great difficulty in achieving the stabilization of polypropylene compositions for various applications and it is impossible to predict the combined effect of a plurality of stabilizers from their effects individually. Specifically, the Mills patent teaches that a four-component stabilizer system comprising an organic phosphite such as dioctyl phosphite, a thioester such as dilaurylthiodipropionate, and two alkylphenol antioxidants such as 1,1,3-tris(2-methyl-4-hydroxy-5-tert-butylphenyl)butane and tetrakis [3-(3,5-ditert-butyl-4-hydroxyphenyl)propeonyloxymethyl] methane is a superior polypropylene stabilizer system for improving resistance to discoloration and embrittlement upon exposure to air and light at normal and high temperatures.

Other prior art patents concerned with the polypropylene stabilization problems include U.S. pat. No. 3,310,509—Fukumoto et al. which teaches that in the production of dyeable polyolefin composition containing a transition metal compound to promote dyeability, heat discoloration can be prevented by incorporating a tin compound along with the transition metal compound, and photostability can be imparted by the further addition of an alkylphenol type antioxidant.

U.S. Pat. No. 3,285,855—Dexter is also concerned with this problem and contains a rather comprehensive list of alkylphenol compounds suitable for stabilizing organic materials, such as polypropylene resins, subject to oxidative deterioration or heat or light deterioration.

SUMMARY OF THE INVENTION

It is a primary object of the present invention to provide a polypropylene composition containing a stabilizer system particularly adapted to withstand, without significant strength or color deterioration, the rather unique and drastic environmental conditions found in a dishwasher.

In accordance with the presently preferred embodiment of the invention, this objective is obtained by providing a polypropylene composition essentially containing as the primary alkylphenol antioxidant and thermal stabilizer, tetrakis [methylene 3-(3',5'-di-tert-butyl-4'-hydroxyphenyl) propionate] methane along with selected secondary antioxidants and stabilizers plus an effective amount of a tin maleate, specifically di-n-butyl tin maleate as a color stabilizer.

The presently preferred formulation in which all additives are given as parts by weight is given in the following table:

TABLE I

|  | Specific | Range |
|---|---|---|
| Propylene ethylene terminal copolymer | 100 |  |
| Talc filler | 25 | 0–45 |
| TiO$_2$ pigment | 2.2 |  |
| Tetrakis [methylene 3-(3',5'-di-tert-butyl-4'-hydroxyphenyl) propionate] methane | 0.5 | 0.2–1.5 |
| Distearyl thio dipropionate | 0.3 | 0.1–0.6* |
| Dilauryl thio dipropionate | 0.5 | 0.1–1.0* |
| Calcium stearate | 0.2 | 0.05–0.5 |
| Dibutyl tin maleate | 0.2 | 0.05–0.25 |
| Bisphenol-A-epoxy resin | 0.2 | 0–0.4 |
| Distearyl Pentaerythritol Diphosphite | 0.25 | 0–0.5 |

*At least one and preferably a mixture of alkyl or aryl thio dipropionates are used. If distearyl thio dipropionate is utilized alone, the amount utilized will be not greater than 0.6 parts. If dilauryl thio dipropionate is utilized alone, the amount utilized will be not greater than 1.0 part.

The poly(propylene-ethylene) copolymer has an isotactic polypropylene center segment and contains approximately 1 to 6 percent ethylene by weight. Similar isotactic polypropylene homopolymers which may be modified as known with ethylene propylene rubber or ethylene propylene diene modified rubber or as ternary blends of these rubbers with high density polyethylene, such as are disclosed in U.S. Pat. No. 3,562,790—Coover et al., may be used. Calcium stearate is a commonly used lubricant. The bisphenol-A-epoxy is commonly used as a crazing resistant additive while the phosphite has been generally used as a processing stabilizer to prevent discoloration during processing of polypropylene compounds.

For a clearer understanding of the invention, the following examples are given:

EXAMPLE I

The example compares the effect of various primary antioxidants used or recommended for general use in the stabilization of polypropylene in the stabilization of a polypropylene composition for withstanding a dishwasher environment. The basic composition in parts by weight used in all of these tests was as follows:

| 100 | parts | Propylene-ethylene copolymer |
| 25 | " | Talc filler |
| 2.5 | " | TiO$_2$ pigment |
| 1.0 | " | Primary antioxidant (as indicated) |
| 0.6 | " | Distearyl thio dipropionate |
| 0.5 | " | Calcium stearate |
| 0.5 | " | Distearyl pentaerythritol diphosphite |

Molded samples in the form of sheets 0.060 inch in thickness containing the different primary antioxidants as listed in Table II were heated in a forced air convection oven to 150°C to determine their resistance to visual craze before and after being subjected to the indicated cycles (DW cycles) of exposure to a dishwasher environment, each cycle involving exposure to 180°F water solution of 0.35% of the dishwasher detergent, commercially available under the name "Cascade" and a drying cycle of one hour at about 180°F. The figures given in the table are the average of the tests on two or three samples of each composition.

TABLE II

| Nominal D/W Cycles | 0 | 750 | 1500 |
|---|---|---|---|
| Composition Number | Days to Visual Craze Following Exposure Days To Craze at 150°C (0.060 inch thick) | | |
| 1708 | 123 | 75 | 90 |
| 1710 | 107 | 37 | 16 |
| 1711 | 110 | 56 | 34 |
| 1712 | 115 | 69 | 48 |
| 1713 | 101 | 78 | 48 |
| 1714 | 51 | 32 | 16 |
| 1773 | 98 | 44 | 28 |
| 1548 | 95 | 32 | 24 |
| 1549 | 74 | 30 | 30 |
| 1550 | 62 | 30 | 18 |
| 1558 | 107 | 30 | 28 |

The primary antioxidants employed in preparing the compositions for the tests set forth in TABLE II are listed and where possible identified by chemical name.

| Composition | Primary Antioxidant |
|---|---|
| 1708 | tetrakis [methylene 3-(3',5'-di-tert-butyl-4'-hydroxyphenyl) propionate] methane |
| 1710 | di-n-octadecyl-2-(3'5'-di-tert-butyl-4'-hydroxyphenyl)adipate |
| 1711 | di-4-octylphenyl-2,2(3',5'-di-tert-butyl-4'-hydroxybenzyl)gluterate |
| 1712 | zinc dicyclohexyl dithio phosphinate |
| 1713 | bis(4-tert-butyl-3-hydroxy-2,6-dimethyl benzyl)-di-thio-terephthalate |
| 1714 | 1,1,3-tris(5 tert-butyl-4-hydroxy-2-methylphenyl) butane |
| 1773 | 1,3,5 trimethyl-2,4,6-tris(3',5'di-tert-butyl-4'-hydroxy benzyl)benzene |
| 1548 | Thio diethylene bis-(3,5-di-tert-butyl-4-hydroxy)hydrocinnamate |
| 1549 | Octadecyl 3-(3',5'-di-tert-butyl-4'-hydroxyphenol)propionate |
| 1550 | 0,0 di-N-octadecyl-3,5-di-tert-butyl-4-hydroxybenzyl phosphonate |
| 1558 | 1,3,5-tris(2,6-di-tert-butyl-4-methylene phenol)isocyanurate |

From the results set forth in TABLE II, it will be seen that composition 1708 containing the primary antioxidant employed in the practice of the present invention is the only composition exhibiting good craze resistance after substantial exposure to a common alkaline dishwasher environment and a craze resistance which declined the least as a result of such exposure. Crazing is a measure of the useful life of a plastic composition in the drastic high temperature aqueous pH 10 to 12 detergent environment of a dishwasher. However, of all of the compositions listed in TABLE II, composition 1708 also showed the greatest change in color, a significant yellowing, after exposure to the dishwasher environment, indicating also that the yellowing was caused by the particular primary antioxidant characterizing composition 1708.

The present invention is based on the discovery that the yellowing caused by this specific primary antioxidant can be controlled substantially by the addition of a tin maleate, specifically di-n-butyl tin maleate. The test results on various compositions as set forth in the following examples show that while the tin maleate addition causes a slight, but acceptable, drop in oxidative stability, it markedly improves the color stability.

EXAMPLE 2

To determine the effect of additive interactions on craze resistance and color stability, polypropylene compounds were prepared having the compositions described in TABLE III. All compositions are expressed as parts by weight.

TABLE III

| Composition* Number | DSTDP | Calcium Stearate | Phosphite (a) | BPA Epoxy Resin | Tin maleate |
|---|---|---|---|---|---|
| 1738 | 0.6 | 0.5 | 0.5 | — | — |
| 1739 | 0.6 | 0.1 | 0.5 | — | — |
| 1740 | 0.6 | 0.1 | 0.25 | — | — |
| 1741 | 0.3 | 0.1 | 0.25 | — | — |
| 1743 | 0.3 | 0.1 | 0.25 | 0.20 | — |
| 1745 | 0.3 | 0.1 | 0.25 | — | 0.20 |
| 1746 | 0.3 | 0.1 | 0.25 | 0.20 | 0.20 |
| 1812 | 0.3 | 0.1 | — | — | — |

*COMMON TO ALL MATERIALS 100 parts propylene-ethylene copolymer
25 parts Talc
2.5 parts TiO$_2$
0.5 part Ciba-Geigy Irganox 1010 tetrakis [methylene 3-3',5'-di-t-butyl-4'-hydroxyphenyl)propionate]methane (a) distearyl pentaerythritol diphosphite The yellowing tendency of these compositions was determined under the indicated test conditions employing a color difference meter per American Society of Testing and Materials Standard D1925. Data are reported as the change in yellowness index following exposure [i.e., YI (exposed) — YI (initial)].

The results of these tests are set forth in TABLE IV.

TABLE IV

| D/W Cycles | Yellowness Index Change Following Exposure | | | | | |
|---|---|---|---|---|---|---|
| | 750 | 1500 | 2160 | 750 | 1500 | 2160 |
| Composition Number | 180°F | | | 150°F | | |
| 1738 | 12.7 | 17.4 | 18.6 | 13.7 | 10.8 | 18.2 |
| 1739 | 11.9 | 25.2 | 32.4 | 11.9 | 12.3 | 22.1 |
| 1740 | 13.7 | 22.2 | 25.0 | 13.7 | 13.9 | — |
| 1741 | 18.1 | 21.6 | 24.8 | 13.5 | 13.4 | 18.2 |
| 1743 | 12.2 | 7.9 | 12.9 | 9.2 | 9.1 | 14.3 |
| 1745 | 4.5 | 11.0 | 8.7 | 2.7 | 8.7 | 11.5 |
| 1746 | 2.7 | 5.5 | 6.7 | 2.7 | 5.9 | 8.0 |
| 1812 | 21.7 | 29.8 | 29.9 | 14.9 | 19.5 | 27.9 |

From these test results, it will be seen that variations in different additives had no significant effect except for the addition of the tin maleate (compositions 1745 and 1746) which materially improved resistance to yellowing.

For comparison, the craze resistance of these compositions are given in TABLE V.

TABLE V

| D/W Cycles | 0 | 750 | 1500 |
|---|---|---|---|
| Composition Number | Days To Visual Craze Following Exposure Days to Craze at 150°C (0.060 inch thick) | | |
| 1738 | 127 | 90 | 55 |
| 1739 | 126 | 86 | 53 |
| 1740 | 136 | 98 | 57 |
| 1741 | 107 | | 66 |
| 1743 | 147 | | 100 |
| 1745 | 107 | 50 | 57 |

TABLE V-Continued

| | Days To Visual Craze Following Exposure | | |
|---|---|---|---|
| D/W Cycles | 0 | 750 | 1500 |
| Composition Number | Days to Craze at 150°C (0.060 inch thick) | | |
| 1746 | 115 | 75 | 88 |
| 1812 | 113 | 54 | 46 |

EXAMPLE 3

The effect of the tin maleate addition was further proven by the results of tests on additional compositions which along with the test results on certain of the compositions previously described are set forth in TABELS VI and VII while the compositions are described in TABLE VIII.

TABLE VI

| | Days To Visual Craze Following Exposure | | | | |
|---|---|---|---|---|---|
| D/W Cycles | 0 | 750 | 1500 | | |
| Composition Number | Days To Craze at 150°C (0.060 inch thick) | | | | |
| | 180°F | | | 150°F | |
| 1741 | 107 | — | 66 | 66 | 82 |
| 1745 | 107 | 50 | 57 | 63 | 72 |
| 1743 | 147 | — | 100 | 88 | — |
| 1746 | 115 | 75 | 88 | 84 | 97 |
| 1744 | 151 | 106 | 69 | 92 | — |
| 1747 | 145 | 130 | — | 108 | — |
| 1760 | 121 | 64 | 83 | 81 | 103 |
| 1756 | 154 | 88 | — | 108 | — |

The following TABLE VII gives the yellowing test results.

TABLE VII

| | Yellowness Index Change Following Exposure | | | | | |
|---|---|---|---|---|---|---|
| D/W Cycles | 750 | 1500 | 2160 | 750 | 1500 | 2160 |
| Composition Number | 180°F | | | 150°F | | |
| 1741 | 18.1 | 21.6 | 24.8 | 13.5 | 13.4 | 18.2 |
| 1745 | 4.5 | 11.0 | 8.7 | 2.7 | 11.5 | |
| 1743 | 12.2 | 7.9 | 12.9 | 9.2 | 9.1 | 14.3 |
| 1746 | 2.7 | 5.5 | 6.7 | 2.7 | 5.9 | 8.0 |
| 1744 | 7.7 | 11.7 | 18.0 | 6.9 | 7.6 | 16.2 |
| 1747 | 4.1 | 7.5 | 9.8 | 4.5 | 5.2 | 7.0 |
| 1760 | 6.2 | 7.7 | 12.4 | 5.1 | 7.2 | 8.3 |
| 1756 | 3.8 | 5.0 | 7.8 | 3.4 | 4.6 | 5.0 |

The ingredients in the various systems listed in TABLES VI and VII are listed in the following TABLE VIII.

TABLE VIII

| Composition Number | |
|---|---|
| 1741 | System V + nothing |
| 1745 | System V + 0.20 phr di-n-butyl tin maleate |
| 1743 | System VII + nothing |
| 1746 | System VII + 0.20 phr di-n-butyl tin maleate |
| 1744 | System VIII + nothing |
| 1747 | System VIII + 0.20 phr di-n-butyl tin maleate |
| 1760 | System IX + nothing |
| 1756 | System IX + 0.20 phr di-n-butyl tin maleate |

BASIC COMPOSITIONS:

| | SYSTEMS V | VII | VIII | IX |
|---|---|---|---|---|
| Propylene-ethylene copolymer | 100 | 100 | 100 | 100 |
| Talc (filler) | 25 | 25 | 25 | 25 |
| TiO$_2$ | 2.5 | 2.5 | 2.5 | 2.5 |

TABLE VIII-Continued

| Composition Number | | | | |
|---|---|---|---|---|
| Tetrakis [methylene-3-(3',5'-di-tert-butyl-4'-hydroxyphenyl) propionate] methane | 0.50 | 0.50 | 0.50 | 0.25 |
| Distearyl thio dipropionate | 0.30 | 0.30 | 0.30 | 0.30 |
| Calcium stearate | 0.10 | 0.10 | 0.10 | 0.10 |
| Distearyl Pentaerythritol diphosphite | 0.25 | 0.25 | 0.25 | 0.25 |
| Bisphenol A epoxy resin | — | 0.20 | 0.20 | 0.20 |
| N,N'-di-acetyladipic acid dihydrazide | — | — | 0.20 | 0.20 |
| 1,3,5-tris(2,6-di-tert-butyl-4-methylene phenol) isocyanurate | — | — | — | 0.75 |

From the test results of TABLE VII it will be seen that 1,3,5-tris(2,6-di-tert-butyl-4-methylene phenol) isocyanurate (Composition 1756) may be advantageously substituted for part of the Irganox 1010. However, the primary stabilizer tetrakis [methylene 3-(3',5'-di-t-butyl-4'-hydroxyphenyl) propionate] methane is essential for the mechanical life of the composition under dishwasher conditions and this antioxidant appears to be unique in this respect. It is also presently conceived that the anti-yellowing contribution of the tin maleate may be obtained by equivalent organo tin maleates and particularly by similar alkyl derivatives such as diisobutyl tin maleate and di-n-octyl tin maleate. It is further contemplated that changes can also be made in the remaining ingredients including the secondary antioxidants. Accordingly, it is intended by the appended claims to cover all such compositions as fall within the true spirit and scope of the invention.

I claim:

1. A composition having improved resistance to aging and discoloration in a high-temperature aqueous alkaline environment comprising a polymeric resinous material, a major portion of which is a moiety selected from propylene homopolymer, propylene-ethylene copolymer and propylene and ethylene polymer blends; and a stabilizer system comprising tetrakis (methylene 3-(3',5'-di-t-butyl-4'-hydroxyphenyl)propionate) methane as an antioxidant and a dialkyl tin maleate as its principal constituents, said tetrakis methane constituent being present in an amount in the range of between about 0.20 and 1.50 percent by weight and said tin maleate being present in an amount in the range of between about 0.05 and 0.25 percent by weight.

2. A composition according to claim 1 also including a second antioxidant.

3. A composition according to claim 1 in which said di-alkyl tin maleate is di-n-butyl tin maleate.

4. A composition according to claim 1 in which said secondary antioxidant is distearyl thiodipropionate.

5. The composition of claim 1 wherein the alkyl groups of said dialkyl tin maleate contain from one to eight carbon atoms.

6. The composition of claim 1 wherein said polymeric resinous material is a homopolymer of polypropylene modified with a rubber compound selected from ethylenepropylene rubber, ethylene propylene diene modified rubber, and combinations thereof.

7. A composition particularly characterized by its resistance to hot alkaline environment comprising a copolymer of propylene and ethylene and a stabilizer system consisting of tetrakis (methylene 3(3',5'-di-t-butyl-4'-hydroxyphenyl)propionate) methane, distearyl thiodipropionate and dilauryl thiodipropionate and a dialkyl tin maleate as a color stabilizer, said tetrakis methane constituent being present in an amount in the range of between about 0.20 and 1.50 percent by weight, said distearyl thiodipropionate being present in an amount in the range of between about 0.1 and 0.6 percent by weight, said dilauryl thiodipropionate being present in an amount in the range of between about 0.1 and 1.0 percent by weight and said dialkyl tin maleate being present in an amount in the range of between about 0.05 and 0.25 percent by weight.

8. A composition according to claim 7 in which said tin maleate is di-n-butyl tin maleate.

9. The composition of claim 6 wherein said propylene ethylene copolymer includes an isotactic polypropylene center segment and contains about one to about six percent ethylene by weight.

* * * * *